United States Patent [19]

Okazaki et al.

[11] Patent Number: 4,606,111
[45] Date of Patent: Aug. 19, 1986

[54] METHOD OF MANUFACTURING UNDETACHABLE FLANGE JOINT

[75] Inventors: Yoichiro Okazaki, Sagamihara; Shigeaki Akazawa, Isehara, both of Japan

[73] Assignees: Mitsubishi Jokogyo Kabushiki Kaisha; The Yokohama Rubber Co., Ltd., both of Tokyo, Japan

[21] Appl. No.: 555,574

[22] Filed: Nov. 28, 1983

Related U.S. Application Data

[62] Division of Ser. No. 454,033, Dec. 28, 1982, abandoned.

[30] Foreign Application Priority Data

Jan. 12, 1982 [JP] Japan .................... 57-2327

[51] Int. Cl.$^4$ .............................................. B21D 39/02
[52] U.S. Cl. ........................................ 29/463; 29/509; 29/513; 29/526 R; 285/365; 403/338; 24/23 B
[58] Field of Search .................. 29/509, 437, 463, 513, 29/526 R; 24/23 R, 23 EE, 23 B; 285/365, 367, 407, 411; 403/338, 335, 336, 344

[56] References Cited

U.S. PATENT DOCUMENTS

| | | | |
|---|---|---|---|
| 298,565 | 5/1884 | Fastenrath | 29/513 UX |
| 421,088 | 2/1890 | Tyler | 285/365 X |
| 494,996 | 4/1893 | Dwelle | 29/509 UX |
| 2,219,161 | 10/1940 | Jacobs | 285/365 |
| 3,231,298 | 1/1966 | Tomb et al. | 285/365 X |
| 3,499,667 | 3/1970 | Pfeuffer | 285/365 X |

FOREIGN PATENT DOCUMENTS 507903  5/1953  Belgium .................... 285/365

Primary Examiner—Charlie T. Moon
Attorney, Agent, or Firm—Birch, Stewart, Kolasch & Birch

[57] ABSTRACT

An undetachable flange joint characterized in that it essentially comprises a pair of semicircular clamp halves of which cross-sectional configuration is designed to tightly fit the outer configuration of a pair of tapered flanges to be joined, said clamp halves having curled portions at their both ends, and two annular links adapted to be engaged around the respective curled end portions so that the pair of flanges are tightly joined to one another by firmly holding the whole flanges by means of the clamp halves under wedging force.

A method of manufacturing an undetachable flange joint characterized in that it is practiced by way of the steps of preparing two semicircular clamp halves having a concave cross-sectional configuration by press forming a strip of metal sheet, arranging said clamp halves opposite to one another with their one end part having an annular link hung therearound, allowing said one end part to be subjected to curling operation in such a manner as to encase the annular link in the curled end portion to joint the clamp halves at the one end thereof, mounting the pair of half assembled clamp halves around the whole flanges to be joined to one another, hanging an annular link around the other end part, and allowing the latter to be subjected to another curling operation in the same manner as described above so as to joint the clamp halves at the other end thereof.

1 Claim, 20 Drawing Figures

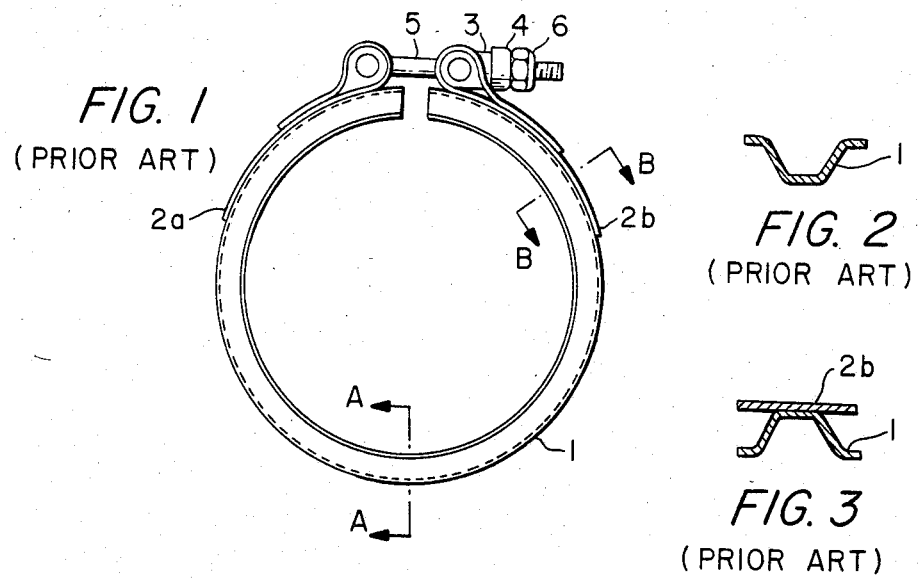
FIG. 1 (PRIOR ART)
FIG. 2 (PRIOR ART)
FIG. 3 (PRIOR ART)
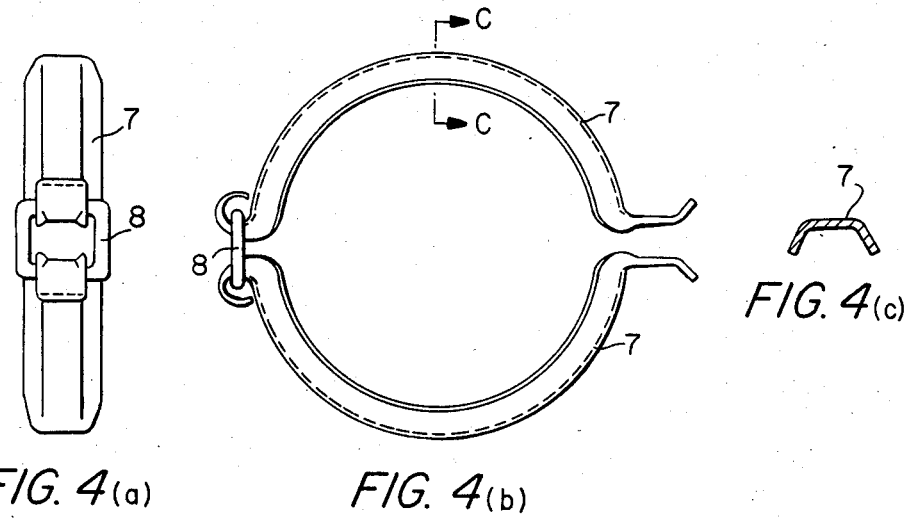
FIG. 4(a)   FIG. 4(b)   FIG. 4(c)
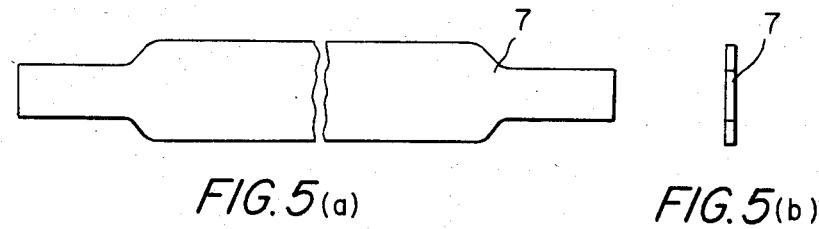
FIG. 5(a)   FIG. 5(b)

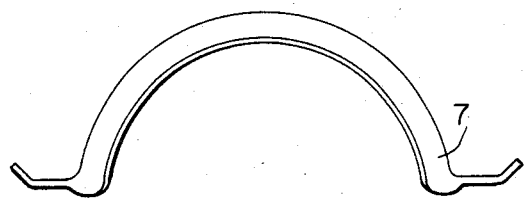
FIG. 6
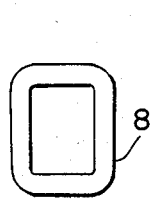
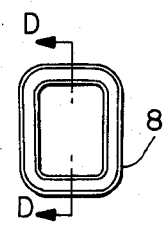
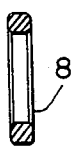
FIG. 7(a)   FIG. 7(b)   FIG. 8(a)   FIG. 8(b)
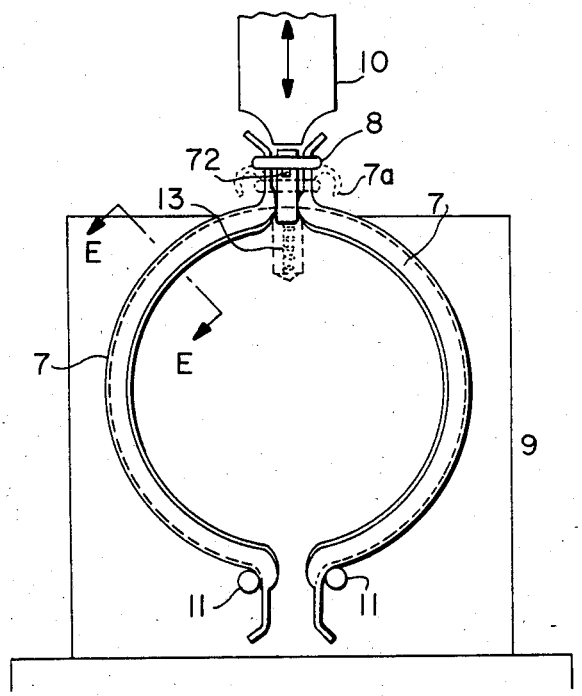
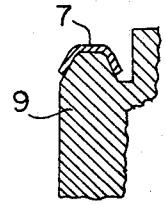
FIG. 9(b)
FIG. 9(a)

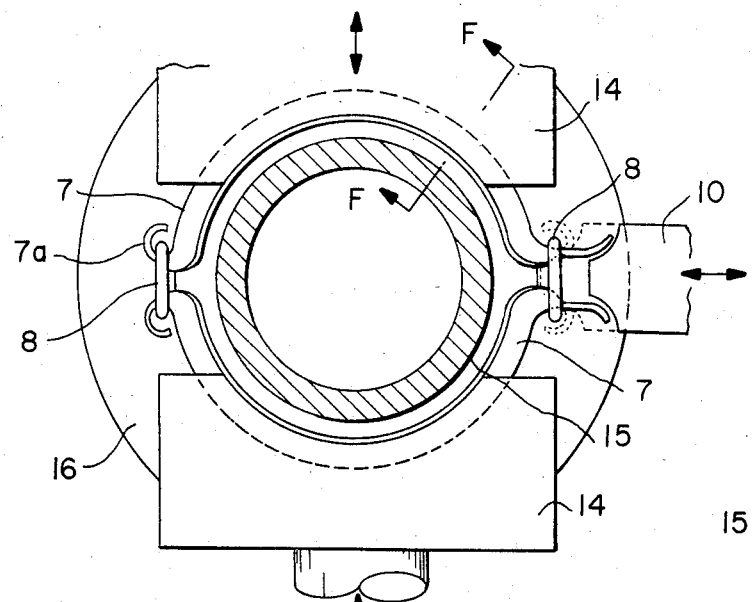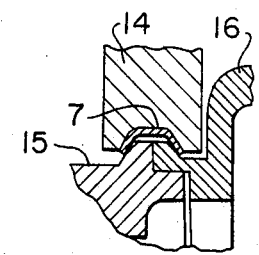
FIG. 10(a)  FIG. 10(b)
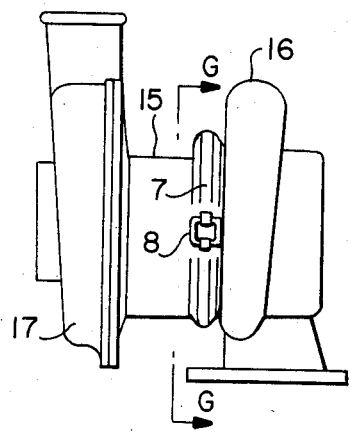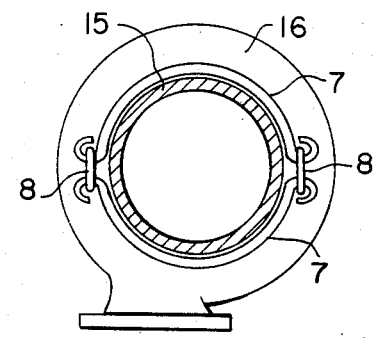
FIG. 11(a)  FIG. 11(b)
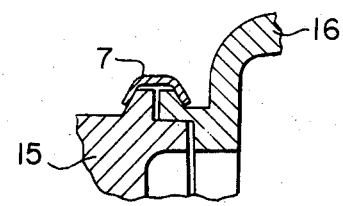
FIG. 12

METHOD OF MANUFACTURING UNDETACHABLE FLANGE JOINT

This application is a divisional of copending application Ser. No. 454,033, filed on Dec. 28, 1982, now abandoned.

BACKGROUND OF THE INVENTION

1. Field of the Invention

The present invention relates to an undetachable flange joint adapted to be used as a clamping device for a supercharger to be mounted on an internal combustion engine and a method of manufacturing said flange joint.

2. Description of the Prior Art

A hitherto known typical clamping device for firmly holding a housing or casing of a supercharger is illustrated in FIG. 1. The components constituting the above clamping device are manufactured in the following manner.

The first step is to allow a strip of stainless steel sheet to be subjected to press forming until a semicircular configuration with a V-shaped cross-section as illustrated in FIG. 2 is obtained. After completion of a trimming operation a retainer 1 as illustrated in the drawings is formed, wherein it is cut to a predetermined circumferential length. Another strip of stainless steel sheet is subjected to press forming operation for punching a hole through which a trunion body 3 or a T-bolt is inserted. The blanked stainless steel sheet is bent to a loop configuration so that a strap 2a or 2b is formed. On the other hand, the trunion body 3 and the trunion cap 4 are prepared by way of the steps of press forming a strip of stainless steel sheet and then subjecting the thus obtained blank to drawing. The trunion body 3 and the trunion cap 4 are press fitted into the straps 2a and 2b.

Next, the head part of the T-bolt 5 is incorporated into the loop portion of the strap 2a in such a manner that it moves freely therein and both the layers of the strap 2a are spot welded to one another. Further, the trunion body 3 is also incorporated into the loop portion of the strap 2b and both the layers of the latter are spot welded to one another. Finally, the strap 2a with the T-bolt 5 included as well as the strap 2b with the trunion body 3 included are bent to the configuration corresponding to the outer diameter of the retainer 1.

After the respective components are prepared in the above-described manner, they are assembled one after another as follows.

The retainer 1 is mounted on a jig which serves to define the outer diameter of the retainer 1 and both the straps 2a and 2b with the T-bolt 5 and the trunion body 3 included therein respectively are attached to both the end parts of the retainer 1 with the use of a suitable jig which is not shown in the drawing. They are then spot welded to the retainer 1 at several positions. Next, the retainer 1 is removed from the jig and the T-bolt 5 is inserted through the trunion body 3. A nut 6 is screwed on the T-bolt 5. Now the preparative steps prior to be mounted on flanges are completed. It should be noted that FIG. 3 is a cross-sectional view of the finished retainer 1, taken in line B—B in FIG. 1.

The conventional flange joint is typically constructed by a combination of components in accordance with the method as described above, but the following drawbacks have been noted with it.

(1) The components have an intricate configuration and the flange joint itself is constructed by a relatively large number of components, resulting in increased man-hours and expensive manufacturing cost.
(2) It is difficult to select the optimum spot welding conditions. Welding operation is required to be carefully conducted under proper control.
(3) There is necessity for preparing special jigs for spot welding operations.
(4) When the flange joint has a reduced inner diameter (for instance, less than 100 mm), roll forming is carried out with much difficulties.
(5) Quick mounting and tightening are impossible, because it takes long time to open the flange joint to mount it on flanges of a supercharger.

SUMMARY OF THE INVENTION

Hence, the present invention has been made in view of the above-described drawbacks inherent to the conventional flange joint and its object is to provide an undetachable flange joint and a method of manufacturing the same which are free from the drawbacks as described above. The flange joint of the invention has a simplified configuration so as to enable press forming to be easily practiced without necessity for any assembling step by welding or the like and make it possible to carry out quick mounting on a supercharger with the aid of a press or the like machine, while it is designed in a small size with remarkably reduced weight. Specifically, the flange joint is constructed by a pair of semicircular clamp halves of which cross-sectional configuration is designed to tightly fit the outer configuration of a pair of tapered flanges to be joined, said clamp halves having a curled portion at their both ends, and two annular links adapted to be engaged around the respective curled end portions so that the pair of flanges are tightly joined to one another by firmly holding the whole flanges by means of the clamp halves under wedging force. On the other hand, the method of manufacturing the flange joint as described above is practiced by way of the steps of preparing two semicircular clamp halves having a typically V-shaped cross-sectional configuration by press forming a strip of metal sheet, arranging said clamp halves opposite to one another with their end part having an annular link engaged therearound, allowing said one end part to be subjected to curling operation in such a manner as to encase the annular link in the curled end portion to joint the clamp halves at the one end thereof, mounting the pair of half assembled clamp halves around the whole flanges to be joined to one another, hanging another annular link around the other end part, and allowing the latter to be subjected to another curling operation in the same manner as described above so as to joint the clamp halves at the other end thereof.

Since the undetachable flange joint and the method of manufacturing the same are constructed in the above-described manner, the following advantages are ensured because a clamping mechanism is embodied by a combination of just two kinds of components comprising clamp halves and annular links and mounting operation is carried out on flanges to be joined to one another with the aid of a press or the like machine.

(1) The flange joint is constructed by a combination of only two kinds of components which are simple in structure. Thus, a press forming die for manufacturing them is easy to be prepared and press operation is carried out without any particular difficulty.

(2) All the manufacturing steps starting from the press forming of the components to the mounting on flanges of a supercharger are conducted with the use of a press or the like machine. This causes mass-production to be practiced easily.

(3) The flange joint can be manufactured at an inexpensive cost even when it has a smaller diameter (less than 100 mm) whereby it satisfactorily meet the requirement for a small size and light weight structure of the supercharger.

(4) Any special step such as spot welding or the like is not required any longer and thereby the number of manufacturing steps is substantially reduced. As a result manufacturing is practiced at an inexpensive cost.

(5) All the components are manufactured by way of press forming, resulting in their stable quality ensured.

BRIEF DESCRIPTION OF THE DRAWINGS

Other objects and advantageous features of the present invention will become apparent from the reading of the following description made with reference to the accompanying drawings in which;

FIG. 1 is a front view of a conventional flange joint.

FIG. 2 is a cross-sectional view of the flange joint, taken along line A—A in FIG. 1, FIG. 3 is a cross-sectional view of the flange joint, taken along line B—B in FIG. 1.

FIG. 4(a) is a front view of a flange joint in accordance with an embodiment of the present invention.

FIG. 4(b) is a side view of the flange joint in FIG. 4(a) as seen from the left side.

FIG. 4(c) is a cross-sectional view of the flange joint, taken along line C—C in FIG. 4(A).

FIG. 5(a) is a plan view of a blank from which a clamp half is manufactured in accordance with a method of the present invention.

FIG. 5(b) is a side view of the blank in FIG. 5(a).

FIG. 6 is a side view of the clamp half is prepared by way of a drawing step using the blank in FIG. 5.

FIG. 7(a) is a front view of a blank for an annular link which is to be in use for the flange joint of the invention.

FIG. 7(b) is a side view of the annular link in FIG. 7(a).

FIG. 8(a) is a front view of an annular link after completion of coining operation.

FIG. 8(b) is a sectional view of the annular link, taken in line D—D in FIG. 8(a).

FIG. 9(a) is a front view of the clamp halves illustrating how they are joined to one another at their one end.

FIG. 9(b) is a sectional view of the clamp half, taken in line E—E in FIG. 9(a). FIG. 10(a) is a front view of the clamp halves illustrating how they are firmly mounted on flanges of a supercharger.

FIG. 10(b) is a sectional view of the flange joint, taken in line F—F in FIG. 10(a).

FIG. 11(a) is a side view illustrating that the flange joint is mounted on the supercharger.

FIG. 11(b) is a cross-sectional view of the flange joint, taken in line G—G in FIG. 11(a), and FIG. 12 is a partial sectional view of the flange joint mounted on the flanges, shown in an enlarged scale.

DETAILED DESCRIPTION OF PREFERRED EMBODIMENT

Now an undetachable type flange joint and a method of manufacturing the same in accordance with the present invention will be described in more details hereunder with reference to the accompanying drawings, particularly FIGS. 4 to 12.

Referring first to FIG. 4, reference numeral 7 designates a clamp half and reference numeral 8 does an annular link. The clamp half 7 is generally manufactured by way of the steps of press forming a blank having a configuration as illustrated in FIG. 5 from a strip of stainless steel sheet having a thickness of approx. 2 mm with the aid of a press machine and deforming the blank to a semicircular configuration as seen from the side having a V-shaped cross section with the aid of another press machine. It is preferable that both the end parts of the clamp half 7 are press worked to a L-shaped configuration at the same time when the semicircular configuration is press worked. FIG. 6 illustrates the clamp half obtained by way of the above-described press working. It should be of course understood that two clamp halves as illustrated in FIG. 6 are prepared.

FIGS. 7(a) and (b) illustrate an annular link 8 for joining two clamp halves 7 to one another, is blanked by means of a press machine.

FIGS. 8(a) and (b) illustrate a finished annular link 8 after completion of a coining operation carried out with the configuration as illustrated in FIGS. 7(a) and (b). One of objects of the aforesaid coining operation is to chamfer the respective corners of the annular link 8 and remove an unevenness after completion of the blanking operation and another one is to allow the material used to be work hardened so as to ensure a sufficiently high designed mechanical strength for the link 8. In view of the above requirements an austenite stainless steel is preferably employed as a material for the link 8, because it is easy to be press worked before coining operation and it is also easy to be work hardened after completion of the coining operation.

FIGS. 9(a) and (b) illustrate how one of clamp joint portions is assembled. Specifically, two clamp halves 7 are placed on a mandrel 9 onto which their V-shaped cross section is tightly fitted, wherein their lower end part is stationarily held by means of pins 11 while their upper end part has an annular link 8 fitted therearound. To prevent the link 8 from falling down below a predetermined position on the upper end part of the clamp halves a support pin 12 serves to hold the link 8. As is apparent from FIG. 9(a), the support pin 12 is resiliently held by means of a coil spring 13 disposed in the mandrel 9 so that it sinks into the mandrel 9 together with the link 8 as the L-shaped end parts of the clamp halves are subjected to curling operation using a curl punch 10. Due to the arrangement as described above the L-shaped end parts are curled in conformance with the concave configuration at the lower end of the curl punch 10 as the latter is actuated downward, until the curled end parts 7a encase the annular link 8 and thereby two clamp halves 7 are joined to one another at their uppper end.

FIGS. 10(a) and (b) illustrate how the clamp halves are assembled on a supercharger. Prior to assembling them tapered flanges of a supercharger 15 and a a turbine casing 16 are fitted to one another so that the combination of both the flanges is fitted to the V-shaped cross section of the clamp halves. After mounting the clamp halves around the pair of flanges the former are firmly held from both the upper and lower sides by means of clamp retainers 14 adapted to be mechanically actuated. Thus, the clamp halves slide down along the tapered faces of the flanges of both the supercharger 15 and the turbine casing 16 whereby the flanges become tightly clamped in accordance with a principle of wedge function. While the tightly clamped state is maintained, another annular link 8 is hung on the L-shaped end parts of the clamp halves 7 and they are then subjected to curling operation by means of a curl punch 10 in the substantially same manner as described above with reference to FIGS. 9(*a*) and (*b*). The intended assembly of the clamp halves on the supercharger is completed by removing the clamp retainers 14 therefrom later.

FIG. 11(*a*) is a side view which illustrates how the flange joint is mounted on the supercharger, whereas FIG. 11(*b*) is a cross sectional view of the supercharger, taken in line G—G in FIG. 11(*a*). It should be noted that the above-described embodiment is merely illustrative and the present invention should be not limited only to this. Namely, the flange joint of the invention is employable not only for ensuring a tight clamping between the supercharger 15 and the turbine casing 16 but also for a tight clamping between the supercharger 15 and the blower casing 17, provided that a combination of their flanges is designed in the same tapered configuration as described above. Finally, FIG. 12 is a partial vertical sectional view of the clamped flanges, shown in an enlarged scale.

What is claimed is:

1. A method of manufacturing an undetachable flange joint characterized in that it is practiced by way of the steps of preparing two semi-circular clamp halves having a concave cross-sectional configuration by press forming a strip of sheet metal into a V-shaped cross-sectional configuration, providing each said clamp half with a first and a second end part, arranging said clamp halves opposite to one another with said first end parts having an annular link hung therearound, causing said first end parts to be subjected to a curling operation in such a manner as to encase said annular link in the curled said first end parts to join said clamp halves at said first end parts, mounting the pair of half assembled clamp halves around two whole flanges to be joined to one another so that the internal circumferential lateral surface of said clamp halves is caused to come in contact with the external circumferential lateral surfaces of said two flanges to be connected together, hanging an annular link around said second end parts of said clamp halves, causing the latter to be subjected to another curling operation in the same manner as described above so as to join said clamp halves at said second end parts, and said curling operations are performed by advancing a curl punch between said clamp halves.

* * * * *